United States Patent [19]

Sorin et al.

[11] Patent Number: 4,721,352

[45] Date of Patent: Jan. 26, 1988

[54] POLARIZING APPARATUS AND METHOD UTILIZING AN OPTICAL FIBER

[75] Inventors: Wayne V Sorin, Mountain View; Karen Liu; Herbert J. Shaw, both of Stanford, all of Calif.

[73] Assignee: The Board of Trustees of the Leland Stanford Junior University, Stanford, Calif.

[21] Appl. No.: 833,953

[22] Filed: Feb. 27, 1986

Related U.S. Application Data

[63] Continuation of Ser. No. 833,819, Feb. 26, 1986, abandoned.

[51] Int. Cl.⁴ .............................................. G02B 5/30
[52] U.S. Cl. ........................... 350/96.15; 350/96.29; 350/337; 350/347 E; 350/352; 350/391
[58] Field of Search .............. 350/96.15, 96.16, 96.29, 350/96.30, 330, 334, 337, 347 R, 347 E, 352, 370, 374, 390, 391

[56] References Cited

U.S. PATENT DOCUMENTS

| | | | |
|---|---|---|---|
| 3,802,760 | 4/1974 | Sosnowski | 350/96.13 |
| 3,918,794 | 11/1975 | Milton | 350/96.16 |
| 4,386,822 | 6/1983 | Bergh | 350/96.15 |
| 4,389,090 | 6/1983 | Lefevre | 350/96.29 |
| 4,422,714 | 12/1983 | Benoit et al. | 350/96.15 |
| 4,493,528 | 1/1985 | Shaw et al. | 350/96.15 |
| 4,536,058 | 8/1985 | Shaw et al. | 350/320 |
| 4,557,551 | 12/1985 | Dyott | 350/96.15 |
| 4,589,728 | 5/1986 | Dyott et al. | 350/96.30 |
| 4,666,235 | 5/1987 | Pavlath | 350/96.15 |

FOREIGN PATENT DOCUMENTS

| | | | |
|---|---|---|---|
| 0145124 | 6/1985 | European Pat. Off. | |
| 0156558 | 10/1985 | European Pat. Off. | |
| 3011663 | 10/1981 | Fed. Rep. of Germany | |
| 3305104 | 8/1984 | Fed. Rep. of Germany | 350/96.29 |
| 53-06052 | 1/1978 | Japan | 350/96.15 |
| 54-137362 | 10/1979 | Japan | 350/96.15 |
| 1536518 | 12/1978 | United Kingdom | |

OTHER PUBLICATIONS

G. Heilmeier, et al., "Dynamic Scattering: A New Electrooptic Effect in Certain Classes of Nematic Liquid Crystals," *Proceedings of the IEEE*, vol. 56, No. 7, Jul. 1968, pp. 1162–1171.

W. Helfrich, "Conduction-Induced Alignment of Nematic Liquid Crystals: Basic Model and Stability Considerations," *The Journal of Chemical Physics*, vol. 51, No. 9, Nov. 1, 1969, pp. 4092–4105.

T. P. Sosnowski, "Polarization Mode Filters for Integrated Optics," *Optics Communications*, vol. 4, No. 6, Feb./Mar. 1972, pp. 408–412.

E. Jakeman, et al., "Electro-Optic Response Times in Liquid Crystals," *Physics Letters*, vol. 39A, No. 1, Apr. 10, 1972, pp. 69–70.

(List continued on next page.)

*Primary Examiner*—John Lee
*Attorney, Agent, or Firm*—Knobbe, Martens, Olson & Bear

[57] ABSTRACT

An apparatus selectively transmits light in one of two orthogonal polarizations in an optical fiber. The apparatus has a facing surface formed at one location on the fiber to expose the evanescent field of an optical signal in the fiber. A nematic liquid crystal is placed in contact with the facing surface so that it is in communication with the evanescent field of the optical signal. The nematic crystals have a first orientation state which presents a first refractive index to light traveling in one polarization and a second refractive index to light traveling in the other polarization. The light traveling in one polarization is well guided while the light traveling in the other polarization is radiated at the facing surface. Thus, only light of one polarization continues to propagate through the fiber. The nematic crystals have a second orientation state in which the relative refractive indices for the two polarizations of light are changed so that the polarization which was originally well guided is radiated at the facing surface and the polarization which was originally radiated is well guided. The change in the orientation states of the nematic crystals is accomplished by applying an electric field between two electrodes so that the nematic crystals align themselves with the electric field.

21 Claims, 9 Drawing Figures

OTHER PUBLICATIONS

D. Berreman, "Solid Surface Shape and the Alignment of an Adjacent Nematic Liquid Crystal," *Physical Review Letters*, vol. 28, No. 26, Jun. 26, 1972, pp. 1683–1686.

C. Hu, et al., "Field-Realigned Nematic-Liqud-Crystal Optical Waveguides," *IEEE Journal of Quantum Electronics*, vol. QE-10, No. 7, Jul. 1974, pp. 556–562.

C. Hu, et al., "Losses of a Nematic Liquid-Crystal Optical Wavequide," *Journal of the Optical Society of America*, vol. 64, No. 11, Nov. 1974, pp. 1424–1432.

Y. Okamura, et al., "Wave Propagation n Semileaky–Type Anisotropic Thin-Film Optical Waveguides," *Journal of Optical Society of America*, vol. 67, No. 4, Apr. 1977, pp. 539–545.

M. Kobayashi, et al., "2×2 Optical Waveguide Matrix Switch Using Nematic Liquid Crystal," *IEEE Journal of Quantum Electronics*, vol. QE-18, No. 10, Oct. 1982, pp. 1603–1610.

D. J. Channin, "Optical Waveguide Modulation Using Nematic Liquid Crystal," *Applied Physics Letters*, vol. 22, No. 8, Apr. 15, 1973, pp. 365–366.

J. R. Whinnery, et al., "Liquid-Crystal Waveguides for Integrated Optics," *IEEE Journal of Quantum Electronics*, vol. QE-13, No. 4, Apr. 1977, pp. 262–267.

R. A. Bergh, et al., "Single-Mode Fibre Optic Directional Coupler," *Electronics Letters*, vol. 16, No. 7, Mar. 27, 1980, pp. 260–261.

H. C. Lefevre, "Single-Mode Fibre Fractional Wave Devices and Polarisation Controllers," *Electronics Letters*, vol. 16, No. 20, Sep. 25, 1980, pp. 778–780.

R. A. Bergh, et al., "Single-Mode Fiber-Optic Polarizer," *Optics Letters*, vol. 5, No. 11, Nov. 1980, pp. 479–481.

W. V. Sorin, et al., "Evanescent Amplification in a Single-Mode Optical Fibre," *Electronics Letters*, vol. 19, No. 20, Sep. 28, 1983, pp. 820–821.

Yasuyuki Okamura, et al., "Electrooptic Leaky Anisotropic Waveguides Using Nematic Liquid Crystal Overlayers," *Journal of Lightwave Technology*, vol. LT-2, No. 3, June 1984, pp. 292–294.

E. S. Goldburt, et al., "Nonlinear Single-Mode Fiber Coupler Using Liquid Crystals," *Applied Physics Letters*, vol. 46, No. 4, Feb. 15, 1985, pp. 338–340.

W. V. Sorin, et al., "A Single-Mode Fiber Evanescent Grating Reflector," *Journal of Lightwave Technology*, vol. LT-3, No. 5, Oct. 1985, pp. 1041–1043.

E. S. Goldburt, et al., "Voltage-Controlled Pulsations of a Liquid-Crystalline Fiber Coupler," *Optics Letters*, vol. 11, No. 1, Jan. 1986, pp. 51–52.

E. S. Goldburt, et al., "Electro-Optical Response of a Liquid-Crystalline Fiber Coupler," *Applied Physics Letters*, vol. 48, No. 1, Jan. 6, 1986, pp. 10–12.

POLARIZING APPARATUS AND METHOD UTILIZING AN OPTICAL FIBER

This application is a continuation of U.S. patent application Ser. No. 833,819, filed Feb. 26, 1986 (now abandoned).

FIELD OF THE INVENTION

The present invention relates to components for use in fiber optic systems, and, more particularly, to components for controlling the transmission of an optical signal through an optical fiber system.

BACKGROUND OF THE INVENTION

As fiber optic systems become more complex, there is a growing need for efficient, low loss components that are compatible with optical fibers. For example, there is a particular need for an in-line device for selectively polarizing an optical signal propagating through a fiber optic system.

SUMMARY OF THE INVENTION

The present invention is an apparatus and method for selectively polarizing an optical signal. The apparatus comprises a single mode optical fiber having an input end portion for receiving light and an output end portion for outputting the light. The fiber has an inner core and an outer cladding. The refractive index of the core is higher than the refractive index of the cladding so that an optical signal traveling within the core of the fiber is well guided. The cladding has a cladding surface at a location on the fiber intermediate the input end portion and the output end portion that is sufficiently close to the core to expose the evanescent field of the light at that location. In the preferred embodiment, the cladding surface is formed by removal of cladding material from one side of the fiber. Liquid crystals are positioned in communication with the evanescent field at the location having the surface formed thereon so as to form an interaction region. The liquid crystal has at least two states of orientation. In one of the states, the liquid crystal has a first index of refraction for light propagating in the fiber in a first polarization and has a second index of refraction for light propagating in the fiber in a second polarization, the second polarization being orthogonal to the first polarization. In the other of the two states, the liquid crystal has a third index of refraction for light propagating in the fiber in the first polarization and a fourth index of refraction for light propagating in the fiber in the second polarization. At least one of the first and second indices of refraction is less than the refractive index of the core and at least one of the third and the fourth indices of refraction is also less than the index of the core. In a preferred embodiment, the first refractive index is substantially equal to the third refractive index and the second refractive index is substantially equal to the fourth refractive index. In this embodiment, one of the first and second refractive indices is less than the index of the core, while the other of the first and second refractive indices is greater than or equal to the index of the core. Similarly, one of the third and fourth indices is less than the index of the core while the other of the third and fourth indices is greater than or equal to the index of the core. In an alternative embodiment, the first, second, third, and fourth indices of refraction are all less than the index of the core. In the alternative embodiment, the first and second indices of refraction of the crystal provide birefringence in the interaction region to cause light to undergo a polarization transformation in the interaction region.

In the preferred embodiment of the present invention, a means is provided for driving the liquid crystal to change the state of orientation of the liquid crystal from the first state to the second state. The driving means preferably comprises a pair of elongate electrodes disposed parallel to the fiber and on opposite sides of the surface for applying an electric field across the liquid crystal.

In the preferred embodiment, the liquid crystal is a nematic crystal having molecules which have a first state of orientation in the absence of an electric field and having a second state of orientation orthogonal to the first state of orientation in the presence of an electric field. Preferably, the liquid crystal presents an anisotropic appearance to the light in both states of orientation so that light propagating in one polarization experiences a different refractive index than the light propagating in a second polarization.

Preferably, the single mode optical fiber is a nonbirefringent optical fiber. The optical fiber is arcuately mounted and the surface is formed by removing cladding from only one side of the fiber so that the surface is flat and oval-shaped.

The present invention also includes a method of manufacturing an optical polarizing device which utilizes an optical fiber having a cladding surface in close proximity to the core of the optical fiber to expose the evanescent field of light propagating through the optical fiber. The method comprises the steps of placing a liquid crystal on the cladding surface for exposure to the evanescent field. The material structure of the liquid crystal is selected and the liquid crystal is oriented relative to the fiber core so that the liquid crystal exhibits a first refractive index for a first polarization of light which is above the refractive index for a second orthogonal polarization and which is below the refractive index of the core. The method further comprises the step of mounting electrodes to drive the liquid crystal to change its orientation so that the first refractive index is raised above the refractive index of the core and the second refractive index is lowered below the refractive index of the core.

The present invention also includes a method of manufacturing a device for transforming the polarization of light wherein the device utilizes an optical fiber having a cladding surface in close proximity to the core of the optical fiber to expose the evanescent field of light propagating through the optical fiber. The method includes the steps of placing a liquid crystal on the cladding surface for exposure to the evanescent field. The method further includes the step of orienting the liquid crystal relative to the fiber core and selecting the material structure of the crystal such that the crystal exhibits a refractive index for two orthogonal polarizations which are both below the refractive index of the core. The method also includes the step of mounting electrodes to drive the liquid crystal to change its orientation such that the refractive index for one of the polarizations changes relative to the refractive index of the other of the polarizations while maintaining the refractive indices for both polarizations below that of the refractive index for the core.

The present invention additionally includes a method of polarizing light utilizing an optical fiber having a cladding surface in close proximity to the core of an optical fiber to expose the evanescent field of light propagating through the optical fiber. The method comprises the steps of utilizing a liquid crystal to cause light of one polarization to preferentially escape from the fiber at the cladding surface while causing light of an orthogonal polarization to be preferentially guided by the fiber at the cladding surface. The method further includes the step of driving the crystal to change its orientation to cause light of the other polarization to preferentially escape from the fiber at the cladding surface while causing light of the first polarization to be preferentially guided by the fiber at the cladding surface.

The present invention also includes a method of transforming the polarization of light utilizing an optical fiber having a cladding surface in close proximity to the core of the optical fiber to expose the evanescent field of light propagating in the optical fiber. The method comprises the steps of utilizing a liquid crystal to cause the fiber to exhibit birefringence at the cladding surface. The liquid crystal has a refractive index lower than that of the fiber core for both of the two orthogonal polarizations to prevent light of either polarization from escaping from the fiber at the cladding surface. The method further comprises the step of orienting the liquid crystal to produce a selected amount of birefringence at the cladding surface to transform the polarization of light propagating through the fiber while maintaining the refractive index of the liquid crystal below that of the core.

DETAILED DESCRIPTION OF THE PREFERRED EMBODIMENTS OF THE PRESENT INVENTION

Figure 1:
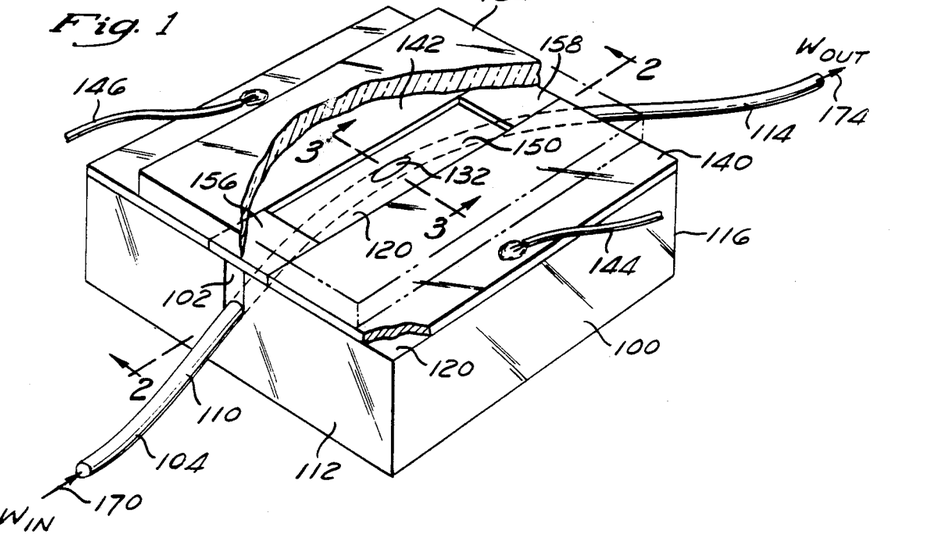
FIG. 1 is a perspective view of an embodiment of the present invention having a portion of the top glass surface cut away to show the underlying features of the invention.
Figure 2:
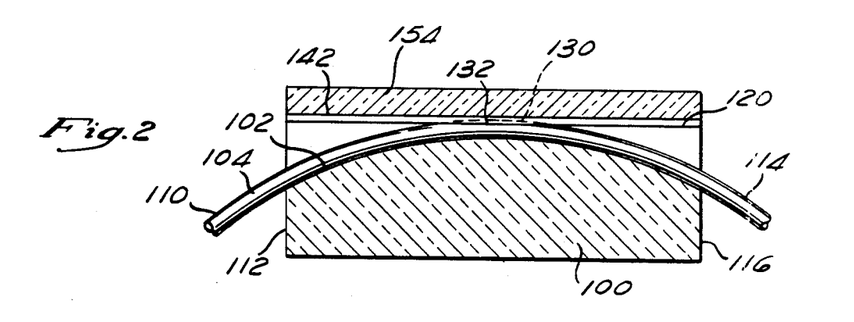
FIG. 2 is a cross-sectional view of the embodiment of FIG. 1 taken along the lines 2—2 in FIG. 1.
Figure 3:
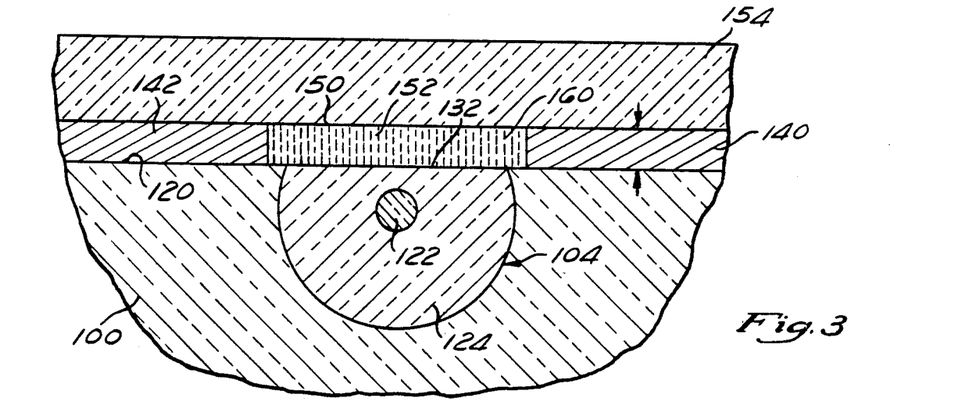
FIG. 3 is an end cross-sectional view of the embodiment of FIG. 1 taken along the lines 3—3 in FIG. 1.

FIGS. 1, 2 and 3 illustrate a preferred embodiment of the invention. The invention comprises a base 100 of silica glass or other suitable material having an arcuate slot 102 formed therein. An optical fiber 104, which is preferably a single-mode optical fiber, is positioned in the arcuate slot 102 so that an input end portion 110 of the optical fiber 104 protrudes from a first end 112 of the base 100 and an output end portion 114 of the optical fiber 104 protrudes from a second end 116 of the base 100. The slot 102 is filled with a suitable epoxy, or the like, to secure the optical fiber 104. As shown in FIG. 3, the optical fiber 104 has an inner core 122 and an outer cladding 124. In one exemplary embodiment, the core 122 is circular and has a diameter of approximately 6 microns and is doped to have a cutoff wavelength of approximately 720 nanometers. The core 122 has a refractive index $n_{core}$. The outer cladding 124 has an outer diameter of 50 microns to 100 microns and is doped to have a refractive index $n_{cladding}$ that is less than the refractive index $n_{core}$. Thus, the light propagating in the optical fiber 104 is well guided.

The base 100 has a top surface 120. The top surface 120 is ground and polished so that a portion 130 (shown in phantom) of one side of the optical fiber 104 is removed to form a flat, oval-shaped facing surface 132 on the cladding 124 of the fiber 104 that is coplanar with the top surface 120. Preferably, the cladding 124 is removed so that only a few microns of cladding (e.g., 0.5–2.0 microns) remain between the core 122 and the facing surface 132. The removal of the portion 130 of the cladding 124 exposes the evanescent field of light propagating in the optical fiber 104. The foregoing structure will be referred to as a fiber optic half-coupler. Additional details relating to this half coupler may be found in U.S. Pat. Nos. 4,493,528 and 4,536,058, which are incorporated herein by reference.

A first electrode 140 and a second electrode 142 are positioned on the top surface 120 of the base 100 on opposite sides of the facing surface 132. In a preferred embodiment, the first electrode 140 and the second electrode 142 are formed by depositing a layer of gold on the top surface 120. The electrodes 140 and 142 are spaced apart by distance $W_e$, which, in an exemplary embodiment, is approximately 50 microns, and are approximately equidistant from the center of the facing surface 132. The first electrode 140 and the second electrode 142 are connected to a voltage source (not shown) via a first electrical interconnection line 144 and a second electrical interconnection line 146, respectively, so that an electrical field can be applied between the two electrodes 140 and 142. The two electrodes 140 and 142 have a thickness $T_e$, which, in the preferred embodiment, is approximately 5 microns.

The electrodes 140 and 142 form a cavity 150 above the facing surface 132 having a width determined by the spacing $W_e$, and a depth determined by the thickness $T_e$. The cavity 150 is filled with a solution 152 of crystals (FIGS. 3 and 4) that have molecules that are nematic within a range of temperatures. For example, in an exemplary embodiment, the crystals 152 are of a class based on bicyclohexane rings that are solid at room temperature and become liquid crystals having a nematic phase in a temperature range of 62 to 85 degrees Celsius. For example, the crystals 152 are S1185 or S1186 available from EM Chemicals, 5 Skyline Drive, Hawthorne, N.Y. 10532. In the experimental embodiment, the crystals were heated to the nematic temperature range by placing the base 100 on a small heater block (not shown). In alternative embodiments, crystals selected to have a nematic phase at room temperature can be used.

Preferably, the cavity 150 is covered with a plate 154 of silica glass or other suitable material so that the crystals 152 are contained within the cavity 150. A first end plug 156 and a second end plug 158 are preferably included to block the flow of the crystal solution 152 in the liquid phase. For example, the end plugs 156 and 158 can advantageously be glass epoxy or the like.

Figure 4:
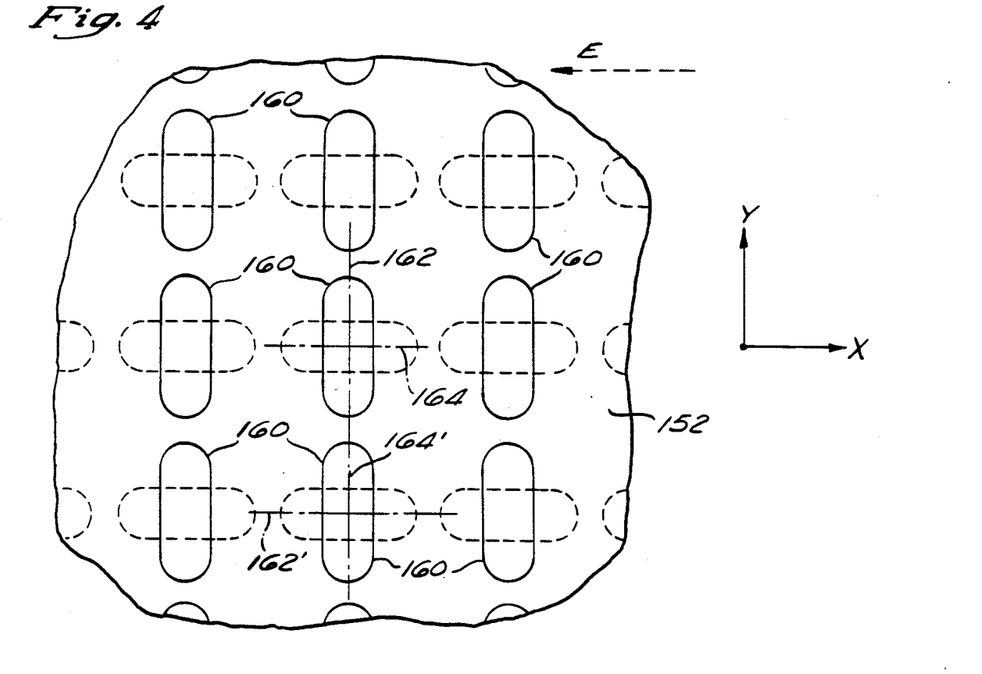
FIG. 4 is an enlarged pictorial representation of the elongated crystals of the nematic liquid crystals used in the present invention, showing a vertical orientation (in solid lines) in the absence of an electric field and showing an orthogonal horizontal orientation (in phantom lines) in the presence of an electric field directed horizontally with respect to the crystals.

As illustrated in FIG. 4, the liquid crystal solution 152 comprises a number of elongated molecules 160 that each have a long axis 162 and a short axis 164. In the nematic phase, the molecules 160 have a first state in which they line up in the same general direction so that all of the long axes 164 are generally parallel and all of the short axes 164 are generally parallel, thus producing a macroscopic effect similar to that of a uniaxial crystal. In the absence of an electric field, the nematic molecules 160 have a preferential alignment shown in solid lines. For example, the molecules 160 are shown aligned such that the long axes 162 are perpendicular to the top surfaces 120 (FIG. 3). In the presence of a strong electric field (e.g., 3–6 volts/micron), the molecules 160 have a second state in which they tend to align themselves with the applied field so that the long axes 162 are substantially parallel to the applied field. In FIG. 4, the applied field is illustrated by a vector arrow E and the molecules 160 are shown in phantom with the long axes 162' substantially parallel to the vector E. Thus, returning to FIG. 3, when a voltage is applied between the first electrode 140 and the second electrode 142, an electric field is formed between the two electrodes 140, 142 that is substantially parallel to the top surface 120. By varying the voltage applied to the electrodes 140, 142 the orientation of the molecules 160 can be varied. For example, a low-frequency (10 Hz to 1000 Hz) AC voltage will cause the orientation of the molecules 160 to change in synchronism with the applied voltage.

In the present invention, the alignment of the long axes 162 of the molecules 160 perpendicular to the top surface 120 in the absence of an electric field is accomplished by coating the top surface 120 with a thin layer (e.g., 260 Angstroms) of $MgF_2$ (not shown). The $MgF_2$ layer is believed to alter the surface forces experienced by the liquid crystal molecules 160 making it more energetically favorable for them to stand on their ends. This alignment is referred to as homeotropic alignment. In the preferred embodiment, the lower surface (not shown) of the plate 154 is also coated with a thin layer of $MgF_2$ so that the liquid crystal molecules 160 are perpendicular to the lower surface of the plate 154.

In an alternative embodiment, the top surface 120 of the base 100 and the facing surface 132 of the optical fiber 104 are polished in a direction transverse to the longitudinal axis of the optical fiber 104 and the surfaces are not coated with the $MgF_2$. In this alternative embodiment, the molecules 160 align themselves parallel to the top surface 120 and perpendicular to the longitudinal axis of the optical fiber 104 at the facing surface 132. This alignment is referred to as homogenous alignment, and is believed to occur because the molecules 160 tend to align themselves with their long axes 162 parallel with the micro-grooves in the fiber surface 132 caused by the transverse polishing. In this embodiment, a vertically disposed electric field will cause the long axes 162 of the molecules 160 to reorient themselves vertically.

It has been shown that nematic crystals placed in the evanescent field of an optical signal present different refractive indices to the light comprising the optical signal in accordance with the polarization of the light. For example, in the preferred embodiment, the nematic crystals have positive anistropy. When the nematic molecules 160 are oriented in the first state, as shown in solid lines in FIG. 4, with the long axes 162 perpendicular to the facing surface 132, the nematic molecules 162 present a higher refractive index $n_{YH}$ to light having a polarization perpendicular to the facing surface 132 (i.e., vertically polarized light represented by an arrow Y in FIG. 4) and a lower refractive refractive index $n_{XL}$ to light having a polarization parallel to the facing surface 132 (i.e., horizontally polarized light represented by an arrow X in FIG. 4). The light in the optical fiber 104 is propagating in a direction orthogonal to the arrows X and Y and is thus going into the page as represented by the dot at the intersection of the two arrows.

When the electric field E is applied to the nematic molecules 160 between the first electrode 140 and the second electrode 142 to reorient the molecules 160 to the second state shown in phantom lines in FIG. 4, the nematic molecules present a lower refractive index $n_{YL}$ to the vertically polarized light and a higher refractive index $n_{XH}$ to the horizontally polarized light. Preferably, the electric field is sufficiently strong so that the nematic crystals 160 in the second state (phantom lines) have their long axes 162' substantially perpendicular (i.e., orthogonal) to the axes 162 in the first state to thereby cause the higher refractive index $n_{YH}$ of the first state to be substantially equal to the higher refractive index $n_{XH}$ of the second state and to cause the lower refractive index $n_{XL}$ of the second state to be substantially equal to the lower refractive index $n_{YL}$ of the first state. In the preferred embodiment, the liquid crystals were chosen so that the lower refractive indices $n_{XL}$ and $n_{YL}$ are lower than the refractive index of the core $n_{core}$ and so that the higher refractive indices $n_{XH}$ and $n_{YH}$ are higher than the refractive index of the core $n_{core}$. Thus, the nematic refractive indices span the refractive index of the core. For example, the low index of the nematic molecules is approximately equal to but less than 1.46, the high index of the nematic molecules is approximately equal to 1.52 and the index of the core is approximately equal to 1.46.

Figure 5:
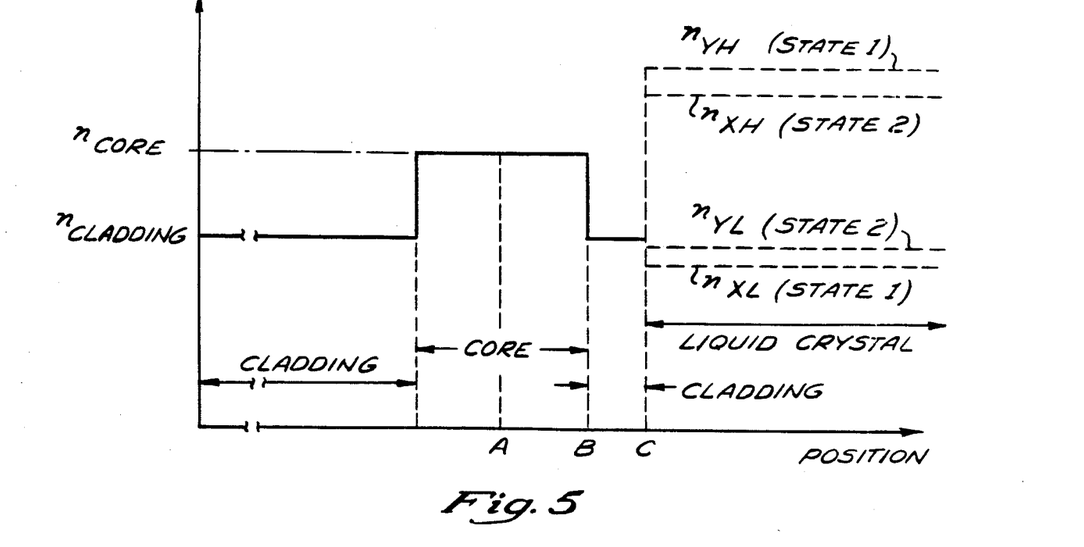
FIG. 5 is a graph of the refractive indices of the core and the cladding of the optical fiber and the refractive indices of the two states of the liquid crystal.

The foregoing is illustrated in FIG. 5 which is a graph of the refractive indices with respect to a vertical cross-section through the optical fiber 104 at the facing surface 132. The horizontal axis of the graph represents the vertical position with respect to the facing surface 132. For example, the location A represents the approximate center of the core 122, the location B represents the interface between the core 122 and the cladding 124 and the location C represents the location of the facing surface 132 (i.e., the interface between the cladding 124 and the liquid crystals 152). The vertical axis of the graph represents the refractive index. Thus, referring to the graph in FIG. 5, the refractive index of the present invention has a refractive index $n_{core}$ at the location B (i.e., within the core 122); a refractive index $n_{cladding}$ in the cladding 124 between the core 122 and the facing surface 132; and a refractive index in the nematic liquid 152 that varies in accordance with the light polarization and in accordance with the orientations of the molecules. The indices $n_{YH}$ and $n_{XL}$ correspond to the state of the nematic molecules 160 in the absence of an applied electric field (i.e., the Y-polarization axis is substantially aligned with the long axes 162 of the nematic molecules 160 and the X-polarization axis is substantially aligned with the short axes 164 of the nematic molecules 160). The indices $n_{YL}$ and $n_{XH}$ correspond to the state of the nematic molecules 160 in the presence of an applied electric field (i.e., the Y-polarization axis is substantially aligned with the short axes 164 of the nematic molecules 160 and the X-polarization axis is substantially aligned with the long axes 162 of the nematic molecules.

As illustrated in FIG. 5 and as discussed above, the high refractive indices $n_{XH}$ and $n_{YH}$ are higher than the refractive index $n_{core}$ of the core 122. In contrast, the low refractive indices $n_{XL}$ and $n_{YL}$ are lower than the refractive index $n_{cladding}$ of the cladding 124. Thus, referring again to FIG. 1, when an optical signal $W_{in}$, represented by an arrow 170, is input into the input end portion 110 of the optical fiber 104 with the light polarized such that the axis of polarization is in substantial alignment with the long axes 162 of the nematic molecules 160 at the facing surface 132, the evanescent field of the light sees a relatively high refractive index at the facing surface 132 and is not well guided. Thus, a substantial portion of the light in this polarization is radiated at the facing surface 132 and does not continue propagating in the optical fiber 104 and is not output at the ouput end portion 114. On the other hand, when the light in the optical signal $W_{in}$ is polarized such that the axis of polarization is substantially orthogonal to the long axes 162 of the nematic molecules 160, the evanescent field of the light sees a relatively low refractive index at the facing surface 132 and is well guided. Relatively little of the light in this polarization mode is radiated at the facing surface 132 and a substantial portion of the light continues to propagate in the optical fiber 104 and is output through the output end portion 114 of the optical fiber 104 as an output signal $W_{out}$, represented by an arrow 174.

In an experimental embodiment, the output signal $W_{out}$ was measured using an optical power meter and the input polarization was varied to verify the effect of the nematic molecules 160 when no voltage was applied between the two electrodes 140 and 142. The polarization extinction ratio is the ratio of the output power for the light having its axis of polarization orthogonal to the long axes 162 of the molecules 160 to the output power for the light having its axis of polarization aligned with the long axes of the molecules 160. The measured extinction ratio for the homeotropic alignment (i.e., using the MgF$_2$ layer) was 45 dB.

Figure 6A:
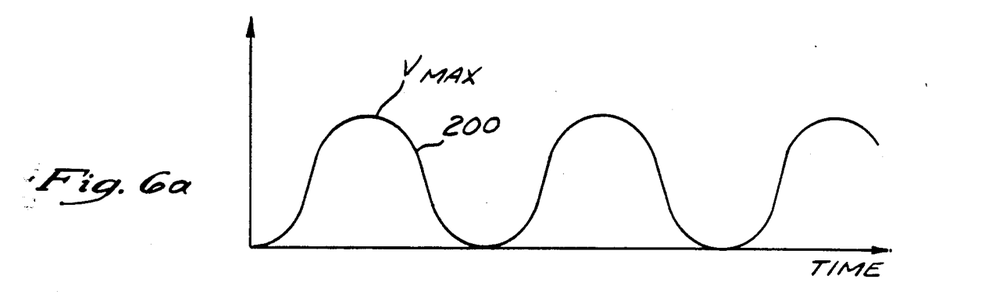
FIGS. 6a and 6b are graphs of the effect of a time-varying electric field on the output light intensity for an input signal in the X-polarization.
Figure 6B:
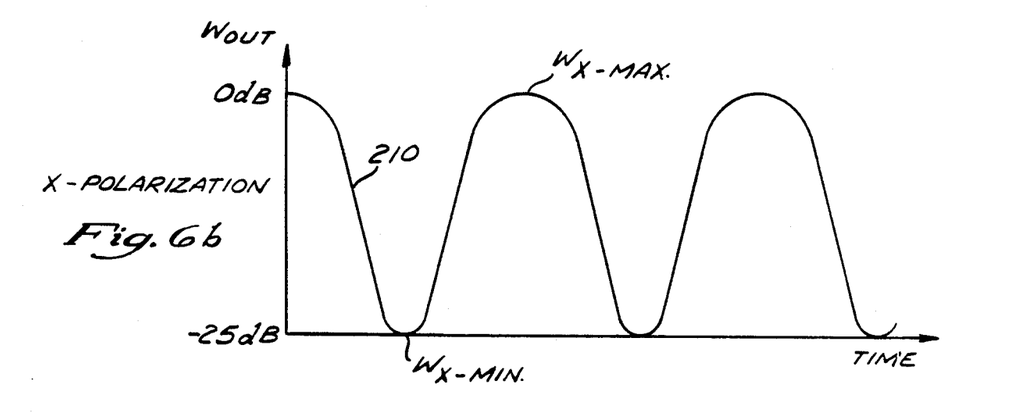
Figure 7A:
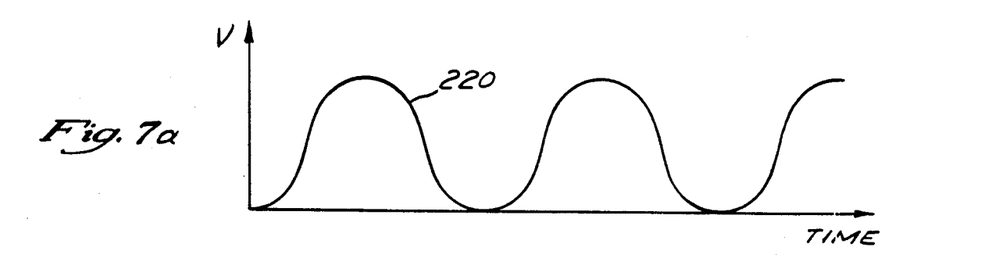
FIGS. 7a and 7b are graphs of the effect of a time-varying electric field on the output light intensity for an input signal in the Y-polarization.
Figure 7B:
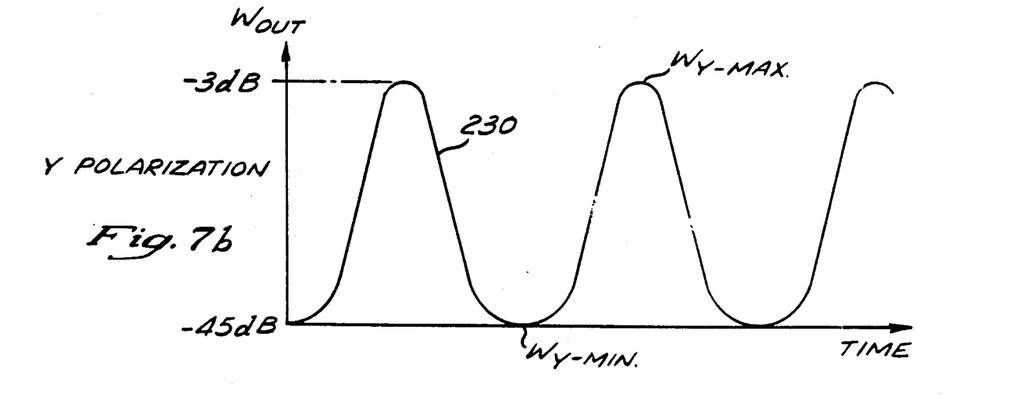

The above-described responses of the present invention to voltages applied between the electrodes 140 and 142 are further illustrated in FIGS. 6a and 6b and in FIGS. 7a and 7b. A curve 200 in FIG. 6a represents a voltage V applied between the two electrodes 140 and 142. In an exemplary embodiment, the voltage V is always positive and varies sinusoidally between zero volts and a positive voltage, for example 175 volts. The positive voltage can be applied to either of the first and second electrodes 140 and 142 and a reference voltage (e.g., ground) can be applied to the other of the two electrodes 140, 142. A graph 210 in FIG. 6b illustrates the intensity of the output signal $W_{out}$ when the polarization of the input signal $W_{in}$ is adjusted so that the output signal $W_{out}$ has a maximum intensity when the voltage between the two electrodes 140, 142 is at zero. The maximum intensity is shown as 0 dB in FIG. 6b. As discussed above, the polarization of the input signal $W_{in}$ is adjusted so that the light is horizontally polarized at the facing surface 132 when the MgF$_2$ layer is applied to the top surface 120 of the base 100 (i.e., the light is polarized orthogonal to the long axes 162 of the molecules 160) and thus the evanescent field of the light in the fiber at the facing surface 132 sees a low refractive index and is well guided. As the voltage V increases, the nematic molecules 160 are reoriented so that they are aligned with the applied electric field. When the voltage V is at a maximum amplitude, shown as $V_{max}$ in FIG. 6a, the measured intensity of the light in the output signal $W_{out}$ is at a minimum, shown as $W_{X-min}$ in FIG. 6b, because the axis of polarization of the light is more closely aligned with the long axes 162 of the molecules 160 and the evanescent field of the light sees a high refractive index and is therefore radiated from the facing surface. In an exemplary experimental embodiment, the measured minimum intensity was approximately −28 dB with respect to the measured minimum intensity. Thus, by varying the applied voltage V, the transmission of the horizontally polarized light can be selectively enabled and disabled, thereby generating an intensity modulated input. As illustrated in FIG. 6b, the measured output intensity is not sinusoidal due to the threshold level of the applied electric field necessary to initiate the reorientation of the long axes 162 of the molecules 160.

FIGS. 7a and 7b illustrate the case when the input optical signal $W_{in}$ is polarized such that the axis of polarization is aligned with the long axes 162 of the nematic molecules 160 when no electric field is applied (e.g., the light is polarized vertically along the Y-axis in the exemplary embodiment). The voltage V applied between the two electrodes 140 and 142 is again a positive voltage that varies sinusoidally between 0 volts and a maximum voltage $V_{max}$ and is represented by a curve 220 in FIG. 7a. When the voltage V is at zero, the evanescent field of the light sees a high refractive index at the facing surface 132 and a substantial portion of the optical energy of the input optical signal will be radiated at the facing surface 132 and will not be output from the output end portion 114. Thus, the measured optical intensity, represented by a curve 230 in FIG. 7b, is at a minimum intensity, shown as $W_{y-min}$, when the voltage V is at 0 volts. As the voltage V increases from 0 volts to its maximum voltage $V_{max}$, the nematic molecules 160 reorient to the orthogonal position shown in phantom in FIG. 4. When this occurs, the evanescent field of the vertically polarized light sees a relatively low refractive index and is well guided in the region of the facing surface 132 and remains in the optical fiber to be output from the output end portion 114. When the voltage V is at $V_{max}$, the measured intensity of the output light is at a maximum, shown as $W_{Y-max}$. Thus, by selectively applying a voltage between the first electrode 140 and the second electrode 142, the transmission of the vertically polarized input light from input end portion 110 to the output end portion 114 of the optical fiber 104 is selectively enabled and disabled. It was found that the maximum voltage V required to obtain the maximum measured output intensity for the light in the Y-polarization was approximately 300 volts and that the maximum measured light intensity (i.e., $W_{Y-max}$) was −3 dB with respect to the maximum measured light intensity in the X-polarization. This is believed to be due, at least in part, to boundary forces between the molecules 160 and the facing surface 132 and to boundary forces between the molecules 160 and the lower surface (not shown) of the plate 154. The boundary forces inhibit complete orthogonal reorientation of a large portion of the molecules 160, particularly those molecules 160 near either surface. Thus, it is believed that increasing the thickness $T_e$ of the electrodes 140 and 142 and thereby increasing the depth of the cavity 150 will increase the number of molecules 160 that are farther away from the surfaces so that a larger percentage of the molecules 160 are able to complete the orthogonal reorientation. The foregoing is further supported by the measured minimum intensity for the Y-polarization which is approximately −45 dB as compared to a minimum of −28 dB for the X-polarization which indicates that the molecules 160 cannot fully rotate into alignment with the X-polarization. Based upon the foregoing, one can see that in the experimental embodiment the higher refractive index $n_{YH}$ for light polarized along the X-axis is less than the higher refractive index $n_{YH}$ for light polarized along the X-axis. Similarly, the lower refractive index $n_{YL}$ for light polarized along the Y-axis is greater than the refractive index $n_{XL}$ for light polarized along the X-axis.

The foregoing operation of the present invention makes it very advantageous for use as a switchable polarizer. By varying the magnitude of the electric field applied between the two electrodes 140 and 142, the present invention can selectively transmit one or the other of the two orthogonal polarizations. The present invention can also be used as a low frequency (e.g., 10 Hz to 10,000 Hz) modulator by inputting the light into the input end portion 110 of the optical fiber 104 and outputting the optical signal at the output end portion 114 while applying an AC voltage V between the two electrodes 140 and 142. At frequencies of approximately 10,000 Hz and higher, the molecules can no longer move in synchronism with the applied voltage and will be reoriented at a location intermediate the two orthogonal orientations.

The operation of the present invention was described above with respect to its effect on input light polarized along either the horizontal axis (parallel to the top surface 120) or the vertical axis (perpendicular to the top surface 120). However, one skilled in the art will understand that the orientation of the molecules 160 can also serve as a frame of reference. The molecules 160 will present a high refractive index to light having an axis of polarization along the long axes 162 of the molecule 160 and will present progressively lower refractive indices to light polarized at an angle between the long axes 162 and the short axes 164. The molecules 160 will present the lowest refractive index, less than the core index, to light polarized along the short axes 164. Thus, the present invention will guide light polarized along the short axes 164 of the molecules 160 and will output that light from the output end portion 114 of the optical fiber 104. Light polarized at an angle from the short axes 164 will see higher effective refractive indices as the angle increases. When the effective refractive index exceeds the refractive index of the core, the light will no longer be well-guided and will be radiated at the facing surface 132. Thus, the light output from the output end portion 114 of the fiber 104 is preferentially polarized along the short axes 164 of the molecules 160. By varying the electric field applied to the liquid crystals, the orientation of the molecules 160 can be varied to select a particular preferential polarization of the light output from the output end portion 114 of the optical fiber 104. Thus, the present invention is useable as a selectable polarizer as well as a switchable polarizer.

The above-described device may be adapted for use as a polarization transformer. In such case, the refractive indices of the liquid crystal for the two orthogonal polarizations are selected such that they are less than the refractive index of the fiber core for both orientation states of the crystal. Except for scattering losses, the relatively low refractive indices prevent any light from escaping the fiber at the interaction region.

When the liquid crystals are oriented, for example, in accordance with the orientation state shown in solid lines in FIG. 4, light polarized in the vertical direction will experience a higher refractive index than light polarized in the horizontal direction. Thus, as light propagates through the interaction region, there will be a relative phase shift between the vertically polarized light and the horizontally polarized light. In effect, the combination of the liquid crystal and the fiber provides a birefringent medium at the interaction region, which exhibits birefringent properties similar to that of a birefringent optical fiber, which has two well defined orthogonal axes of birefringence. As is well known, light input to a birefringent optical fiber will undergo a polarization transformation as it propagates down the fiber (so long as the light is not linearly polarized along one axis of birefringence). In general, birefringence causes a transformation of the state of polarization, and may also cause a transformation in the direction of polarization. For example, if linearly polarized light is input at 45° relative to the axes of birefringence, the light will be initially linearly polarized at 45°. As the light propagates down the fiber, its polarization will be transformed from linear to elliptical. After one half beat length of propagation down the fiber, the direction of polarization will be transformed. The amount and type of polarization transformation is thus dependent upon both the amount of birefringence and the propagation distance through the birefringent medium.

The liquid crystal induces axes of birefringence in the interaction region, and thus, light propagating through the interaction region is transformed in polarization in a manner similar to that of a birefringent optical fiber. The transformation can be varied between at least two states by changing the orientation state of the liquid crystals from that shown in solid lines in FIG. 4, so as to change the difference between their refractive indices. This changes the amount of birefringence, and thus, the polarization transformation characteristics of the device. In such manner, the device may be utilized to transform the polarization of applied light to different polarization states and different polarization directions.

What is claimed is:

1. An apparatus, comprising:

a single mode optical fiber having an input end portion for receiving light and an output end portion for outputting said light, said fiber having a core and a cladding, the refractive index of said core higher than the refractive index of said cladding, the cladding having a cladding surface intermediate said input and output end portions which is sufficiently close to the core to expose the evanescent field of said light at a selected location along the length of said fiber; and a plurality of liquid crystal molecules in communication with said evanescent field at said selected location to form an interaction region, said liquid crystal molecules having at least two states of orientation, a first of said states providing a first refractive index for light propagating in said fiber in a first polarization, and a second refractive index for light propagating in said fiber in a second polarization, orthogonal to said first polarization, a second of said states providing a third refractive index for light propagating in said fiber in said first polarization and a fourth refractive index for light propagating in said fiber in said second polarization, at least one of said first and second refractive indices being less than the refractive index of the core so that light propagating in said polarization corresponding to said at least one of said first and second refractive indices is well-guided by said optical fiber when said liquid crystal molecules have said first state of orientation, and at least one of said third and fourth refractive indices being less than the refractive index of the core so that light propagating in said polarization corresponding to said at least one of said third and fourth refractive indices is well-guided by said optical fiber when said liquid crystal molecules have said second state of orientation.

2. An apparatus, as defined by claim 1, additionally comprising a pair of electrodes that drive said liquid crystal molecules to change their state of orientation from said first state to said second state.

3. An apparatus, as defined by claim 2, wherein said pair of electrodes are elongate and are disposed parallel to said fiber and on opposite sides of said cladding surface.

4. An apparatus as defined by claim 2, wherein said electrodes are sized and positioned with respect to said cladding surface and said liquid crystal molecules so that substantially all of said liquid crystal molecules proximate to said cladding surface are driven from said first state to said second state.

5. An apparatus, as defined by claim 1, wherein said first refractive index is substantially equal to said fourth refractive index and said second refractive index is substantially equal to said third refractive index.

6. An apparatus, as defined by claim 1, wherein one of the first and second refractive indices is less than the refractive index of the core while the other of the first and second refractive indices is greater than or equal to the refractive index of the core.

7. An apparatus, as defined by claim 6, wherein one of the third and fourth refractive indices is less than the refractive index of the core while the other of the third and fourth refractive indices is greater than or equal to the refractive index of the core.

8. An apparatus, as defined by claim 1, wherein said liquid crystal molecules are nematic.

9. An apparatus, as defined by claim 1, wherein said single mode optical fiber is a non-birefringent optical fiber.

10. An apparatus, as defined by claim 1, wherein said fiber is arcuately mounted and said cladding surface is formed by removing cladding from only one side of said fiber such that said cladding surface is flat and oval-shaped.

11. An apparatus, as defined by claim 10, wherein said cladding surface includes microgrooves for causing preferential alignment of said liquid crystal molecules.

12. An apparatus, as defined by claim 1, wherein said first, second, third and fourth refractive indices are all less than the refractive index of said core.

13. An apparatus, as defined by claim 12, wherein said first and second refractive indices of said liquid crystal molecules provide birefringence in said interaction region to cause said light to undergo a polarization transformation in said interaction region.

14. An apparatus as defined by claim 12, further including a pair of elongate electrodes which are sized and positioned with respect to said cladding surface and said liquid crystal molecules so that a voltage applied to said electrodes causes substantially all of said liquid crystal molecules proximate to said cladding surface to change from said first state of orientation to said second state of orientation.

15. A method of polarizing light utilizing an optical fiber having a cladding surface in close proximity to the core of the optical fiber to expose the evanescent field of light propagating through the optical fiber, said method comprising:

positioning a plurality of elongate liquid crystal molecules proximate to said cladding surface to cause light of one polarization to preferentially escape from said fiber at said cladding surface while causing light of an orthogonal polarization to be preferentially guided by said fiber at said cladding surface; and driving said liquid crystal molecules to change the orientation of said molecules proximate to said cladding surface to cause light of said orthogonal polarization to preferentially escape from said fiber at said cladding surface while causing light of said one polarization to be preferentially guided by said fiber at said cladding surface.

16. A method of transforming the polarization of light utilizing an optical fiber having a cladding surface in close proximity to the core of the optical fiber to expose the evanescent field of light propagating in the optical fiber, said method comprising:

positioning a plurality of elongate liquid crystal molecules proximate to said cladding surface with substantially all of said molecules proximate to said cladding surface oriented with respect to said cladding surface to cause said fiber to exhibit birefringence at said cladding surface, said plurality of liquid crystal molecules having refractive indices lower than that of the fiber core for both of two orthogonal polarizations to prevent light of either polarization from escaping from the fiber at the cladding surface; and selectively reorienting substantially all of said plurality of liquid crystal molecules proximate to said cladding surface with respect to said cladding surface to produce a selected amount of said birefringence at said cladding surface to transform the polarization of light propagating through said fiber while maintaining said refractive indices of said plurality of liquid crystal molecules for both of said polarizations below the refractive index of the core.

17. The method, as defined by claim 16, wherein said step of selectively reorienting substantially all of said liquid crystal molecules comprises applying a voltage to a pair of electrodes located on opposite sides of said cladding surface, each oriented in a plane normal to said cladding surface.

18. The method as defined in claim 16, wherein said liquid crystal molecules are nematic.

19. The method as defined in claim 16, wherein said optical fiber is a non-birefringent, single-mode optical fiber.

20. A method of manufacturing an optical polarizing device utilizing an optical fiber having a core and a cladding, said core having a core refractive index and said cladding having a cladding refractive index, said optical fiber having a cladding surface in close proximity to the core of the optical fiber to expose the evanescent field of light propagating through the optical fiber, said method comprising:

placing a plurality of liquid crystal molecules on the cladding surface for exposure to the evanescent field;

orienting the liquid crystal molecules relative to the fiber core and selecting the material structure of the liquid crystal molecules such that said liquid crystal molecules exhibit a first refractive index for a first polarization of said light which is above the refractive index of the core and exhibit a second refractive index for a second orthogonal polarization which is below the refractive index of the core so that light having said first polarization is not well-guided by said optical fiber at said cladding surface and so that light having said second polarization is well-guided by said optical fiber at said cladding surface; and mounting electrodes to drive said liquid crystal molecules to change their orientation such that the second refractive index is raised above the refractive index of the core and the first refractive index is lowered below the refractive index of the core so that light having said first polarization is well-guided by said optical fiber at said cladding surface and so that light having said second polarization is not well-guided at said cladding surface.

21. A method of manufacturing a device for transforming the polarization of light, said device utilizing an optical fiber having a cladding surface in close proximity to the core of the optical fiber to expose the evanescent field of light propagating through the optical fiber, said method comprising:

placing a plurality of elongate liquid crystal molecules on the cladding surface for exposure to the evanescent field;

orienting substantially all of the liquid crystal molecules relative to the fiber core and selecting the material structure of said liquid crystal molecules such that said liquid crystal molecules exhibit first and second refractive indices for first and second orthogonal polarization which are below the refractive index of the core; and mounting electrodes proximate to said cladding surface to drive said liquid crystal molecules to change the orientation of substantially all of said liquid crystal molecules proximate to said cladding surface such that the refractive index for one of said first and second polarizations change relative to the refractive index of the other of said first and second polarizations while maintaining the refractive indices for both polarizations below the refractive index of the core.

* * * * *